(12) United States Patent
Schoels

(10) Patent No.: US 11,864,481 B2
(45) Date of Patent: Jan. 9, 2024

(54) CULTIVATOR

(71) Applicant: Juergen Schoels, Dallein (AT)

(72) Inventor: Juergen Schoels, Dallein (AT)

( * ) Notice: Subject to any disclaimer, the term of this patent is extended or adjusted under 35 U.S.C. 154(b) by 1087 days.

(21) Appl. No.: 16/603,706

(22) PCT Filed: Apr. 18, 2018

(86) PCT No.: PCT/AT2018/060074
§ 371 (c)(1),
(2) Date: Oct. 12, 2019

(87) PCT Pub. No.: WO2018/191767
PCT Pub. Date: Oct. 25, 2018

(65) Prior Publication Data
US 2021/0105927 A1    Apr. 15, 2021

(30) Foreign Application Priority Data

Apr. 18, 2017 (AT) .............................. A 50062/2017

(51) Int. Cl.
| A01B 63/00 | (2006.01) |
| A01B 19/02 | (2006.01) |
| A01B 61/04 | (2006.01) |
| A01B 23/02 | (2006.01) |
| A01B 35/06 | (2006.01) |
| A01B 35/24 | (2006.01) |

(Continued)

(52) U.S. Cl.
CPC ............ *A01B 63/008* (2013.01); *A01B 19/02* (2013.01); *A01B 23/02* (2013.01); *A01B 35/06* (2013.01); *A01B 35/24* (2013.01); *A01B 39/22* (2013.01); *A01B 61/046* (2013.01); *A01B 19/10* (2013.01)

(58) Field of Classification Search
CPC ....... A01B 63/008; A01B 63/32; A01B 19/02; A01B 19/10; A01B 61/046; A01B 35/06; A01B 35/24; A01B 23/02; A01B 39/22
See application file for complete search history.

(56) References Cited

U.S. PATENT DOCUMENTS

| 689,595 | A | * | 12/1901 | Lindgren | ................ | A01B 19/02 |
| | | | | | | 172/621 |
| 711,956 | A | * | 10/1902 | Furthmiller | ............ | A01B 19/02 |
| | | | | | | 172/621 |

(Continued)

*Primary Examiner* — Thomas B Will
*Assistant Examiner* — Joel F. Mitchell
(74) *Attorney, Agent, or Firm* — Andrew Wilford

(57) ABSTRACT

A harrow has a frame, tines pivotal on the frame and each a lower arm with a soil surface under the harrow. An actuator on the frame can shift a bar frame shiftable horizontally on the frame. Respective spring biasing units above the axes each have a guide element connected to the bar frame and displaceable therewith through a predetermined displacement path, a connecting element connected to respective upper arms of the tines, a first compression spring bearing on both of the elements and biasing the other element away from the one element so as to press the lower arm downward into the soil surface during movement of the respective guide element through the path, and a second compression spring bearing continuously on one of the elements and engageable with the other of the elements after displacement of the respective spring-biasing unit only through a part of the path.

12 Claims, 4 Drawing Sheets

(51) Int. Cl.
*A01B 39/22* (2006.01)
*A01B 19/10* (2006.01)

(56) References Cited

U.S. PATENT DOCUMENTS

| | | | | | |
|---|---|---|---|---|---|
| 753,452 | A | * | 3/1904 | Van Brunt | A01B 39/18 |
| | | | | | 172/500 |
| 835,879 | A | * | 11/1906 | Bowman | A01B 19/02 |
| | | | | | 172/621 |
| 1,176,334 | A | * | 3/1916 | Bergman | A01B 19/02 |
| | | | | | 172/621 |
| 2,236,780 | A | * | 4/1941 | Oerman | A01B 19/02 |
| | | | | | 29/891 |
| 2,320,000 | A | * | 5/1943 | Juliot | A01B 19/02 |
| | | | | | 172/622 |
| 2,429,013 | A | * | 10/1947 | Barrentine | A01B 19/02 |
| | | | | | 172/243 |
| 3,760,882 | A | * | 9/1973 | Geurts | A01B 61/042 |
| | | | | | 172/260.5 |
| 3,765,159 | A | * | 10/1973 | Neff | A01B 45/00 |
| | | | | | 56/396 |
| 4,063,598 | A | | 12/1977 | Boldrin | |
| 4,177,865 | A | * | 12/1979 | Lewison | A01B 35/24 |
| | | | | | 172/705 |
| 2016/0234994 | A1 | * | 8/2016 | Gray et al. | A01B 63/24 |
| 2017/0079190 | A1 | * | 3/2017 | Steinlage et al. | A01B 19/04 |

* cited by examiner

Fig. 1
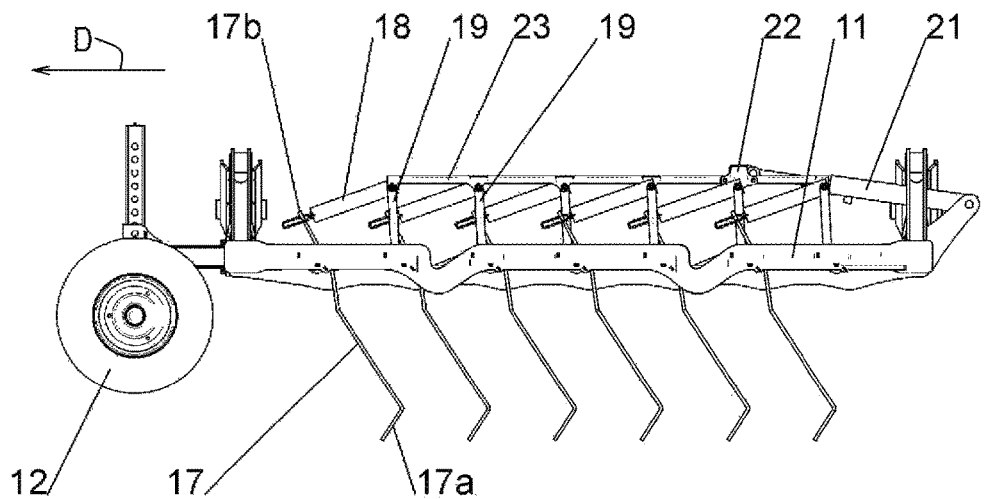
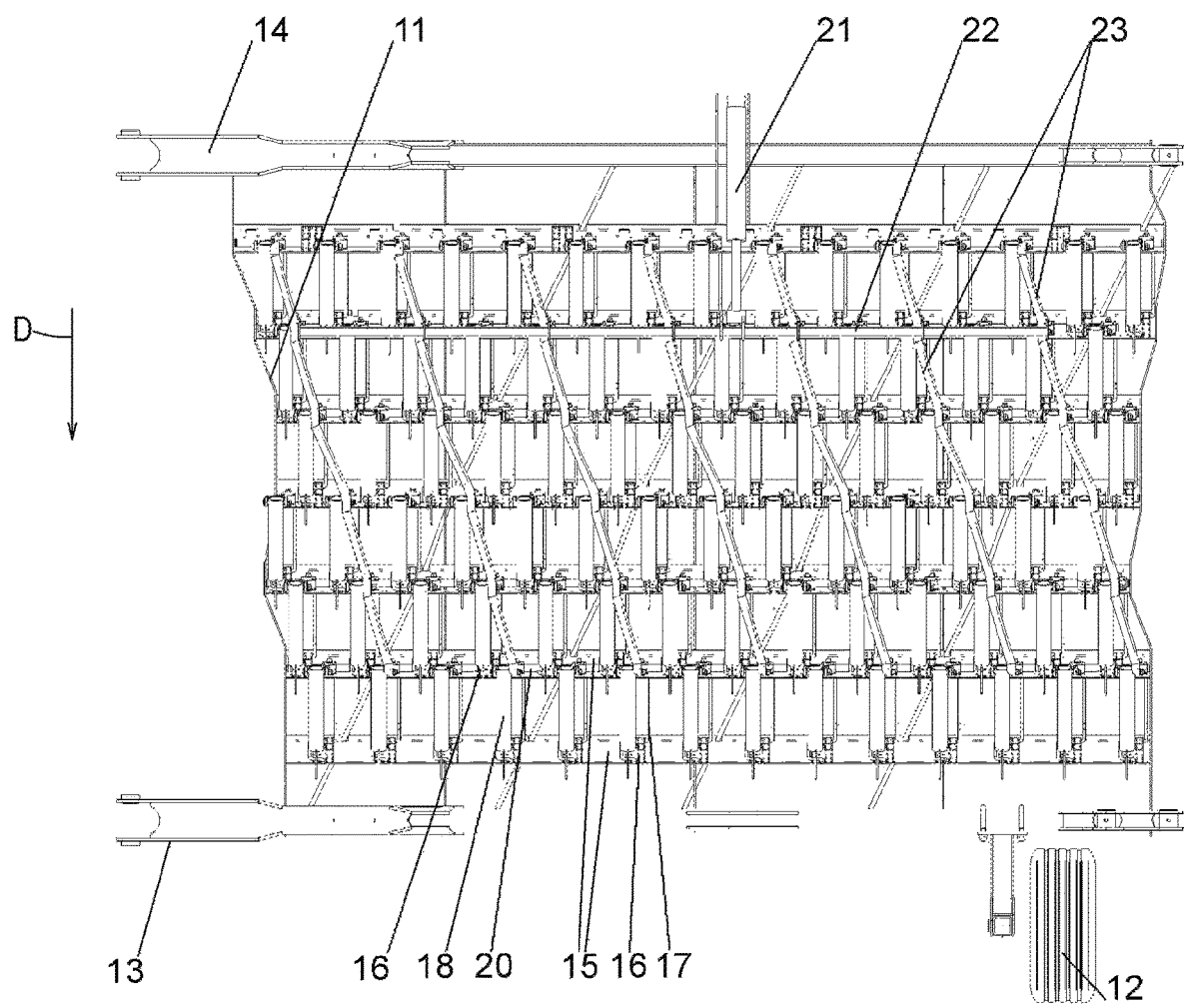
Fig. 2

US 11,864,481 B2

CULTIVATOR

CROSS REFERENCE TO RELATED APPLICATIONS

This application is the US-national stage of PCT application PCT/AT2018/060074 filed 18 Apr. 2018 and claiming the priority of Austrian patent application GM50062/2017 itself filed 18 Apr. 2017.

TECHNICAL FIELD

The present invention relates to a harrow, particularly for cultivating soil surfaces of crop plantings, comprising a support frame, a plurality of tines pivotal on the support frame, and an adjustment mechanism connected to the tines and having an actuator for centrally adjusting a prestress of the tines determined by springs and that is above pivot axes of the tines, the tines being two-armed levers having upper ends on each of which acts a respective spring-biasing unit having an other end movable by the actuator, at least some of the other ends of the spring-biasing units being connected to the actuator by bars, all of which are above the pivot axes of the tines.

PRIOR ART

A harrow comprising a support frame, a plurality of tines pivotal on the support frame, and an adjusting mechanism associated with the tines by means of which the prestress of tines that are prestressed by springs is centrally adjustable by an actuator located above the pivot axes of the tines is known from EP 1961283. According to that document, the tines are one-armed levers. The actuator, for example a hydraulic cylinder, is connected to traction cables respectively connected by appropriately arranged pulleys and respective springs to a tine. Since the tines are one-armed levers, the spring must inevitably act below the pivot axes of the tines, and the traction cables also extend at least partially below these pivot axes.

Since the springs, and the cables to some extent, are below the pivot axes of the tines, the crops are easily damaged by these parts.

A harrow of the type described above is known from EP 983715. By virtue of this construction, the above-mentioned disadvantage is avoided: Since the tines are two-armed levers, it is possible to effect the actuation via the spring-biasing units above the pivot axes of the tines, so that the space below the pivot axes can remain almost completely open.

However, a drawback to this solution is that the tines are always pressed into the ground with a certain minimum pressure that results from the weight of the springs and the weight of the tines. In the case of very light soils, the tines thus often penetrate too deeply, even when the tension springs are relieved. Nor is it possible to raise the tines. In order to prevent the tines from contacting the ground (which is the case particularly when the harrow is uncoupled from the tractor and parked, because otherwise the tines could bend), the contact wheels must be set all the way down.

DESCRIPTION OF THE INVENTION

It is the object of the present invention to remedy these drawbacks.

According to the invention, this object is achieved by a harrow of the type described above where each spring-biasing unit has a first compression spring in a guide element and having another end closer to the tine and movable by the actuator and an opposite end farther away from the tine and connected via a connecting element to the tine.

By compressing the springs, the tine is thus pressed into the ground and/or it is able to pass over obstacles with further compression of the compression spring. Conversely, it can also be relieved as a result of the guide element, because this can also raise the tine via the connecting element.

Thus, the force with which the tines are pressed into the ground can not only be reduced to zero, but the tines can even be raised in the opposite direction. The contact wheels can thus always remain in the working position, even if the harrow is uncoupled from the tractor and parked.

Preferably, the guide element for the compression spring is a tube, in which case the end of the first compression spring remote from the tines acts on a disk that is guided in the tube, and the disk is connected to the connecting element. Due to the design of the guide element as a tube, the compression spring is protected from contamination, and the risk of injury of pinching fingers being between the turns of the compression spring is also eliminated. In addition, the tube can serve as a guide for the disk via which the tines are lowered or raised.

What is more, this makes it possible for a second compression spring to be provided coaxially with the first compression spring, thus enabling the characteristic of the spring-biasing unit to vary according to requirements. If the second compression spring is shorter than the guide element in the relaxed state, both compression springs become active only after a certain compression of the first compression spring, so that the characteristic increases more steeply from this point.

According to another preferred feature of the invention, the connection of the spring-biasing units with the tines has a lost motion. Even if the tine is raised only slightly in very light soil so that it does not penetrate too deeply into the ground by its own weight, then it is able to avoid an obstacle (a stone) due to the lost motion without the spring-biasing unit being activated. The characteristic therefore has three stages: during the lost motion no spring is active, then the first compression spring, and finally the first and the second compression spring.

Preferably, the support frame has a plurality of successively arranged transverse beams, and the tines are arranged in rows and supported on these transverse beams. This makes it possible to connect the other ends of the spring-biasing units to levers that are also rotatably mounted on the transverse beams. Depending on the length of the spring-biasing units, the lever is supported on the adjacent transverse beam or possibly on the next one or even on the transverse beam second over with respect to the transverse beam on which the corresponding tine is supported. As a result, the other end of the spring-biasing units can only move along a circular arc, which simplifies operation.

Furthermore, it is expedient if the levers of each row are each mounted on a shaft that is supported on one of the transverse beams. In this way, all of the levers of a row can be adjusted together, so that the spring prestress on all of the tines in this row is the same.

The actuating movement of the actuator can be transferred in such a way that the actuator acts on a transverse bar that is connected to longitudinal bars that are connected to at least some of the levers of each row. As a result of the shaft, it is sufficient if every second lever of each row is connected to one of the longitudinal bars. The interposed lever is adjusted by the shaft. It is also possible for fewer longitudinal bars to be provided (i.e. for only every third or every fourth lever to be controlled by longitudinal bars), but then the shaft has to be dimensioned larger.

Alternatively, it is preferable, particularly if high loads are to be expected, that a frame that can be displaced by the actuator be formed by rods and that an additional frame be provided above the movable frame that is connected to the support frame at several points by connecting elements, thereby stiffening the support frame.

In this embodiment, the movable frame is thus sandwiched between the support frame and the additional frame, so that there is a relatively large spacing between the support frame and the additional frame so that the support frame and the additional frame together form a highly stable three-dimensional structure.

The actuator is preferably a hydraulic cylinder. But it can also be a linear motor, or by an adjusting spindle that can be driven by an electric motor or by a pneumatic cylinder.

BRIEF DESCRIPTION OF THE DRAWINGS

The present invention will be explained in further detail with reference to the attached drawings.

FIGS. 1 and 2 show the left half of a first embodiment of a harrow according to the invention, FIG. being a side view from the right (relative to the direction of travel) and FIG. 2 being a top view;

EMBODIMENT OF THE INVENTION

Figure 3:
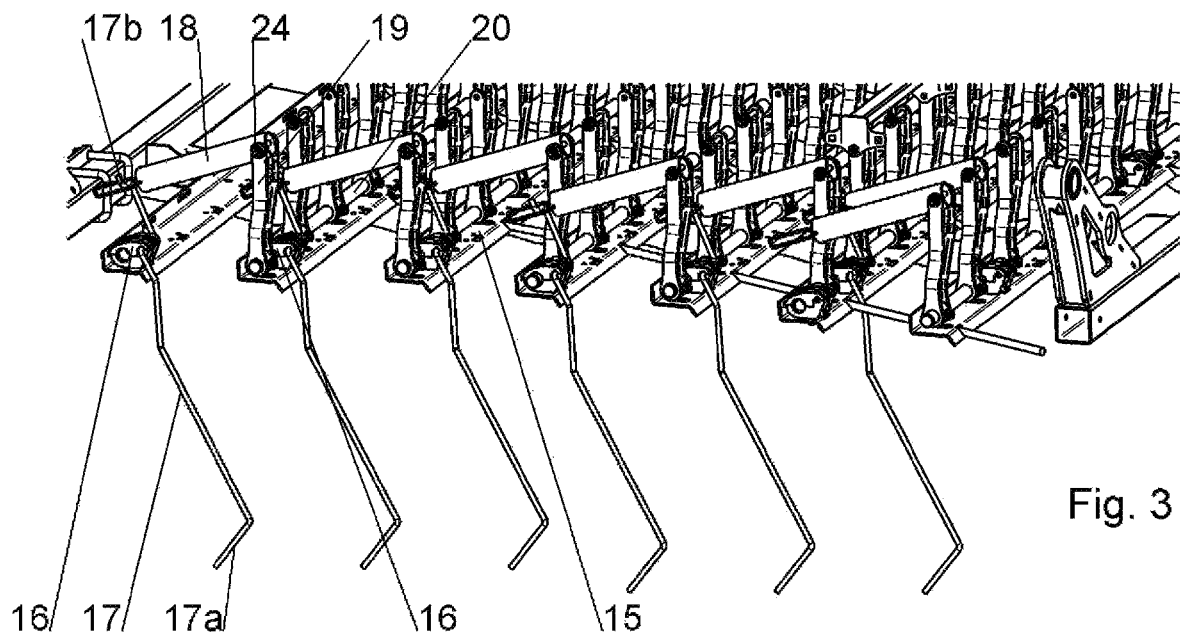
FIG. 3 is a section through some transverse beams of the harrow according to FIGS. 1 and 2.

FIGS. 1 and 2 show the left half of a harrow according to the invention, the right half being a mirror image thereof. In FIG. 1, the longitudinal direction of travel is to the left, and in FIG. 2 it is downward. The illustrated half of the harrow has a support frame 11 with a height-adjustable contact wheel 12 at a front end in the direction of travel in the usual manner. Moreover, connecting beams 13, 14 are provided which serve to connect the left and the right halves of the harrow. The support frame 11 has a plurality of parallel and spaced transverse beams 15 (see also FIG. 3) on which bearings 16 are mounted for respective tines 17. The tines 17 are two-armed levers whose lower end 17a work the soil and whose free ends 17b are each connected to one end of a respective spring-biasing unit 18. The other end of each spring-biasing unit 18 is connected to the upper free end of a respective lever 19 fixed to a respective one of a plurality of shafts 20 mounted in bearings 16 on the transverse beams 15.

A hydraulic cylinder 21 (see FIGS. 1 and 2) that acts on a transverse bar 22 is provided for adjustment. This transverse bar 22 is connected to generally longitudinal bars 23 that are each in turn connected to the upper free ends of the levers 19 (see FIG. 1). As can be seen from FIG. 2, only about half as many longitudinal bars 23 are as the number of tines 17 on each transverse beam 15. Since the levers 19 (see FIG. 3) are rotationally fixed to the respective shafts 20, all of them and thus all of the spring-biasing units 18 synchronously execute the same adjusting movement when the hydraulic cylinder 21 (see FIGS. 1 and 2) is actuated.

Figure 4:
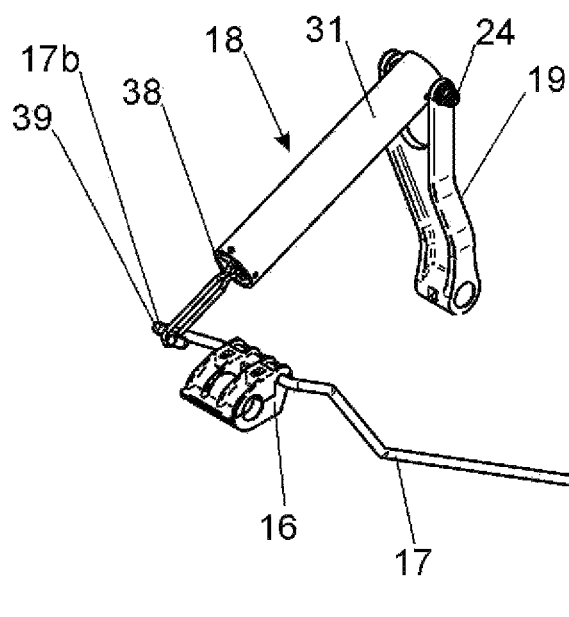
FIG. 4 shows a tine with its operator.
Figure 5:
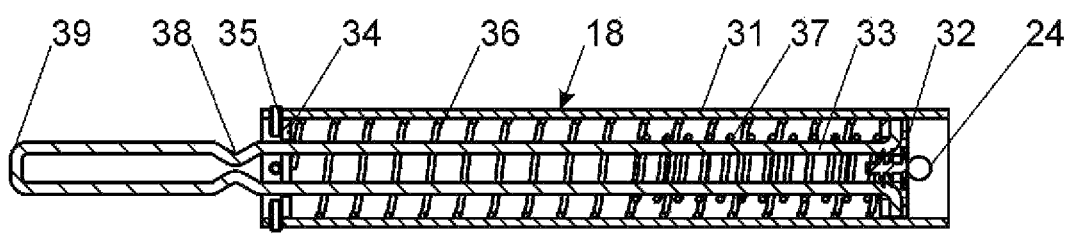
FIG. 5 is a section through the spring-biasing unit of the operator.
Figure 6:
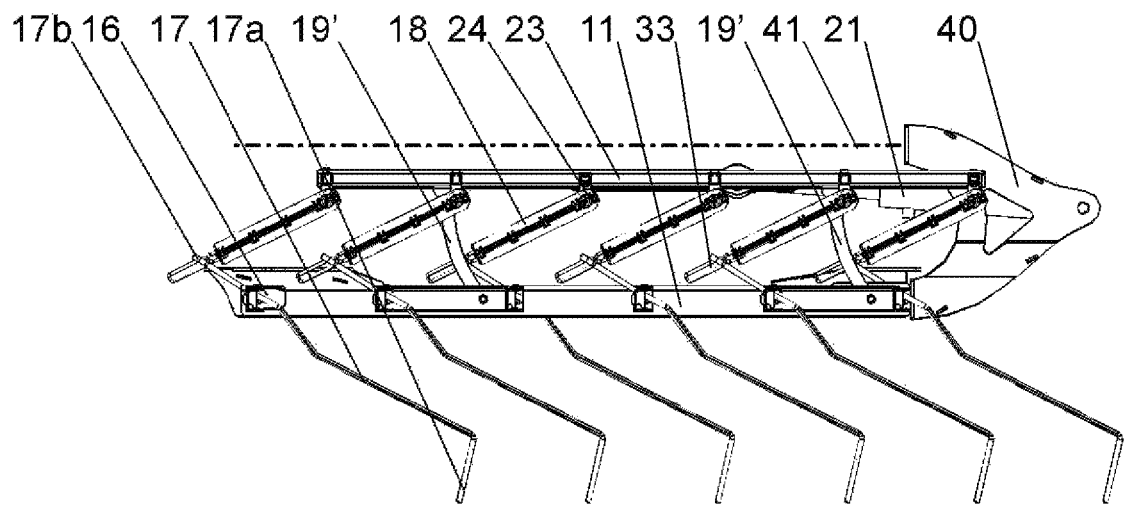
FIGS. 6 to 8 show as in FIGS. 1 to 3 a second embodiment of a harrow according to the invention.
Figure 7:
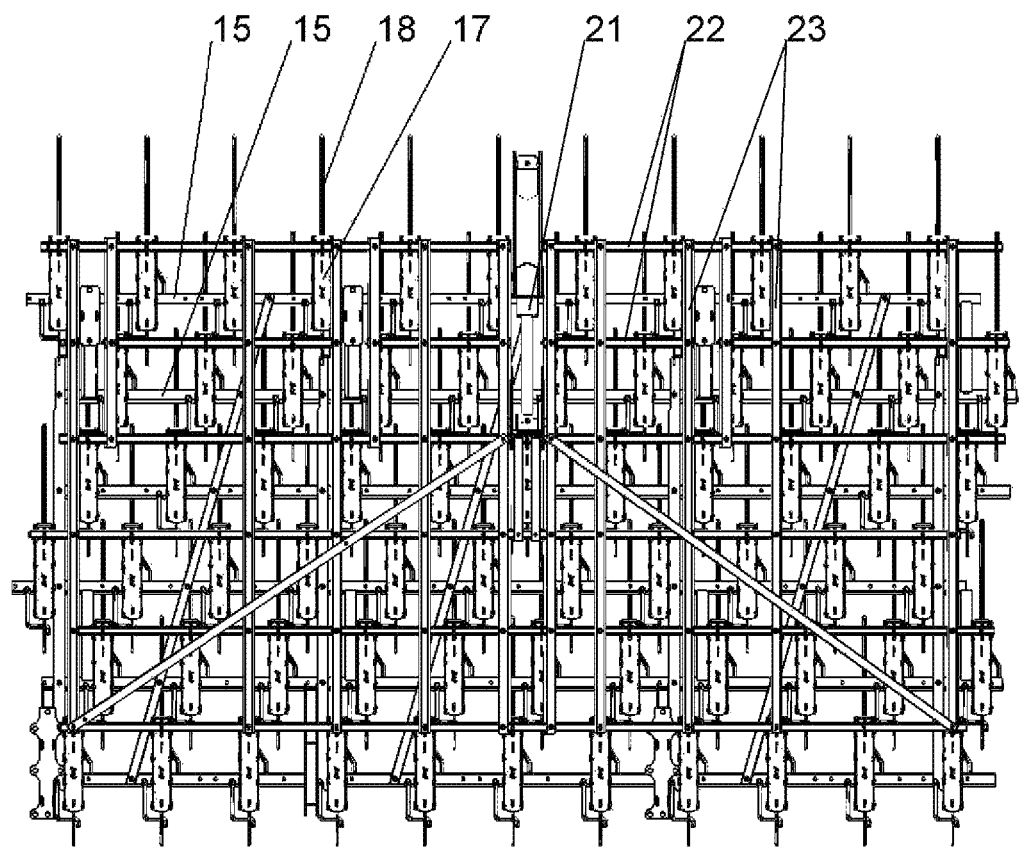
Figure 8:
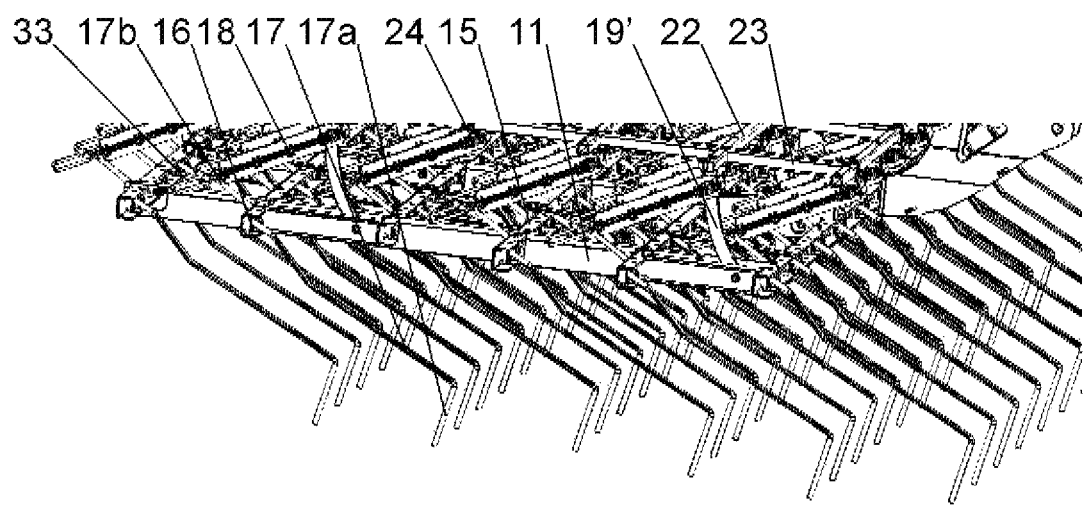

The adjustment by the spring-biasing unit 18 will now be explained in greater detail with reference to FIGS. 4 and 5. A perforated disk 32 can move in a tube 31. This perforated disk 32 has recesses into which engage the angled ends of a connecting element 33, which is essentially a U-shaped wire. The perforated disk 32 can move to the right to an end position against a bolt 24 that pivots tube 31 on the lever 19. A disk 34 that fixed by bolts 35 against movement to the left is located at the opposite end of the tube 31. A first outer compression spring 36 and a second shorter, inner compression spring 37 are disposed between the two disks 32 and 34.

If the tube 31 is pulled to the right by the bolt 24 (i.e. actually by the lever 19) against the resistance of the connecting element 33, the perforated disk 32 moves to the left relative to the tube 31 against the force of the outer first compression spring 36. After about half of the displacement path, the inner compression spring 37 then also becomes active, resulting in a pronounced increase in restoring force. This is important in order to enable heavy soils to be worked: In heavy soils, the lever 19 is moved far enough that both compression springs 36, 37 are active, whereas for lighter soils it is moved only so far that only the outer first compression spring 36 is active.

As can be seen from the drawings, the connecting element 33 has a region 38 at which the spacing between the two legs is reduced. If the tube 31 is moved sufficiently far to the left, the upper end 17b (see FIG. 4) of the respective tine 17 comes to rest at this region 38, and the tine 17 is raised if the tube 31 is moved farther. If the tines 17 are raised to the maximum, then the harrow according to the invention can be parked without adjustment of the contact wheels 12 (see FIGS. 1 and 2) and without the risk of the tines 17 standing on the ground and bending.

The upper end 17b of the tines 17 is able to move freely between this point 38 (see FIGS. 4 and 5) and the end 39, resulting in a lost motion. This makes it possible to raise the tines 17 only slightly in extremely light soils where even just the weight of the tines 17 would cause excessively deep penetration into the soil. In this situation, if a resistance occurs (due to a stone, for example), the tines 17 can swing out about the lost motion without the first compression spring 36 or even the compression spring 37 becoming active.

The embodiment according to FIGS. 5 to 8 is similar to the embodiment described above, and the same parts therefore have the same references. However, there are no shafts 20 carrying levers 19 for pivoting of the spring-biasing units 18. Instead, levers 19' are provided that displaceably, here pivotally, support a movable frame consisting of the transverse bars 22 and the longitudinal bars 23. This movable frame is in turn moved by the hydraulic cylinder 21. The spring-biasing units 18 are pivoted on the bolts 24 on this movable frame. This enables greater forces to be transmitted. Another difference from the embodiment according to FIGS. 1 to 3 is only suggested: A connecting element 40 connected to the support frame 11 has an upper end connected to an additional (immovable) frame (not shown and indicated by a dot-dash line 41 in FIG. 5). As will readily be understood, there are a plurality of these connecting elements so that the additional frame (which in the usual manner can have longitudinal members, transverse bars, and diagonal stiffening elements) forms, together with the support frame 11, a high-strength, torsionally rigid, three-dimensional element in the interior of which the movable frame is located.

The invention claimed is:

1. A harrow comprising:
a frame;
an array of tines pivotal about respective horizontal axes on the frame, the tines each having an upper arm extending upward from the respective axis above the axes and a lower arm extending downward from the respective axis and engageable with a soil surface under the harrow;
an extensible actuator above the axes on the frame;
a bar frame shiftable horizontally on the frame above the axes by the actuator; and
respective spring biasing units above the axes and each having
  a guide element connected to the bar frame and displaceable therewith through a predetermined displacement path,
  a connecting element connected to a respective one of the upper arms,
  a first compression spring bearing on both of the elements and biasing the elements away from each other so as to press the lower arm downward into the soil surface during movement of the respective guide element through the path, and
  a second compression spring bearing continuously on one of the elements and engageable with the other of the elements after displacement of the respective spring-biasing unit only through a part of the path.

2. The harrow according to claim 1, wherein the guide element is a tube and that an end of the first compression spring farther from the tine acts on a disk movable in the tube and connected to the connecting element.

3. The harrow according to claim 1, wherein the second compression spring is coaxial with the first compression spring.

4. The harrow according to claim 3, wherein the second compression spring is shorter than the first compression spring and the guide element in a relaxed state of the first compression spring.

5. The harrow according to claim 1, wherein movement of the spring-biasing units relative to the tines has lost motion.

6. The harrow according to claim 1, wherein the support frame has a plurality of successively arrayed transverse beams, and the tines are arranged in rows each supported on a respective one of these transverse beams.

7. The harrow according to claim 6, further comprising:
levers rotatably mounted on the transverse beams and forming pivots connecting the spring-biasing units to the bar frame.

8. The harrow according to claim 7, further comprising:
respective shafts rotatably supporting the levers of each row on a respective one of the transverse beams.

9. The harrow according to claim 8, wherein the bar frame further includes longitudinal bars crossing transverse bars, the actuator acts on one of the transverse bars that is connected to the longitudinal bars connected to at least some of the levers of each row.

10. The harrow according to claim 9, wherein each second lever of each row is connected to a respective one of the longitudinal bars.

11. The harrow according to claim 6, further comprising:
an additional frame connected to the bar frame and connecting elements connecting the frame at multiple points to the bar frame, thereby stiffening the frame.

12. The harrow according to claim 1, wherein the actuator is a hydraulic cylinder.

* * * * *